United States Patent [19]

Akiyama et al.

[11] Patent Number: 5,768,387

[45] Date of Patent: Jun. 16, 1998

[54] KEY AUTHENTICATION METHOD AND KEY AUTHENTICATION APPARATUS

[75] Inventors: Ryota Akiyama; Makoto Yoshioka, both of Kawasaki, Japan

[73] Assignee: Fujitsu Limited, Kawasaki, Japan

[21] Appl. No.: 509,008

[22] Filed: Jul. 31, 1995

[30] Foreign Application Priority Data

Aug. 10, 1994 [JP] Japan ................................. 6-219365

[51] Int. Cl.⁶ .......................................... H04L 9/32
[52] U.S. Cl. ............................. 380/4; 380/25; 382/122
[58] Field of Search ........................ 380/4, 25; 382/122, 382/186

[56] References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,805,222 | 2/1989 | Young et al. . |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,901,358 | 2/1990 | Bechet . |
| 4,949,257 | 8/1990 | Orbach . |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |

(List continued on next page.)

FOREIGN PATENT DOCUMENTS

| | | |
|---|---|---|
| 43 21 765 A1 | 1/1994 | Germany . |
| 63-138449 | 6/1988 | Japan . |

OTHER PUBLICATIONS

Japanese Patent Laid–Open Publication No. 57–127259, Aug. 7, 1982 (equivalent to Japanese Patent Publication No. 61–22815).

Japanese Patent Laid–Open Publication No. 5–89363, Apr. 9, 1993.

Japanese Patent Laid–Open Publication No. 5–266575, Oct. 15, 1993.

Japanese Patent Laid–Open Publication No. 5–298085, Nov. 12, 1993.

Japanese Patent Laid–Open Publication No. 6–95871, Apr. 8, 1994.

*Primary Examiner*—Gilberto Barrón, Jr.
*Attorney, Agent, or Firm*—Staas & Halsey

[57] ABSTRACT

A key authentication device and method which, through the use of user-unique information, prevents the improper use of software. The key authentication device is equipped with a software storage medium for storing software with encoded characters, graphs, images, or sound, and, when using the software of this software storage medium, employs an input characteristics detection section for detecting the characteristics of input operations performed by a user, a management center for encoding input characteristics detected by the input characteristics detection section and for generating consent information, and a comparison section for comparing the consent information generated by the management center with the input characteristics detected by the input characteristics detection section.

13 Claims, 14 Drawing Sheets

U.S. PATENT DOCUMENTS

| | | |
|---|---|---|
| 5,103,476 | 4/1992 | Waite et al. . |
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |
| 5,337,357 | 8/1994 | Chou et al. .................................. 380/4 |

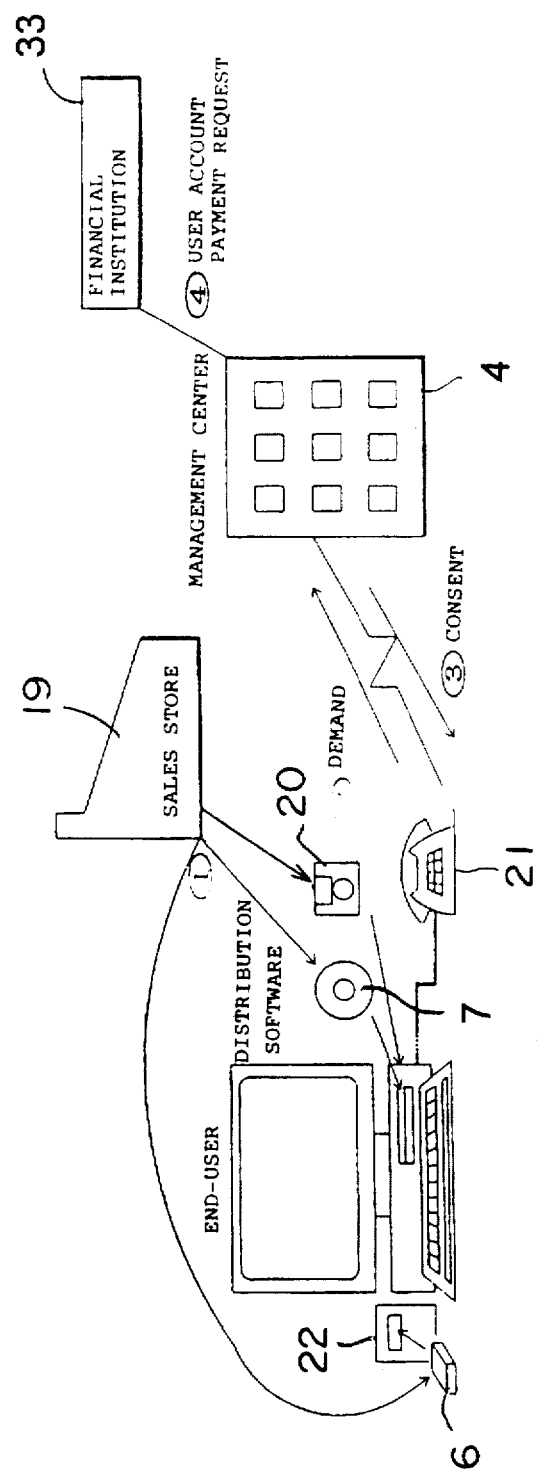
F I G. 5

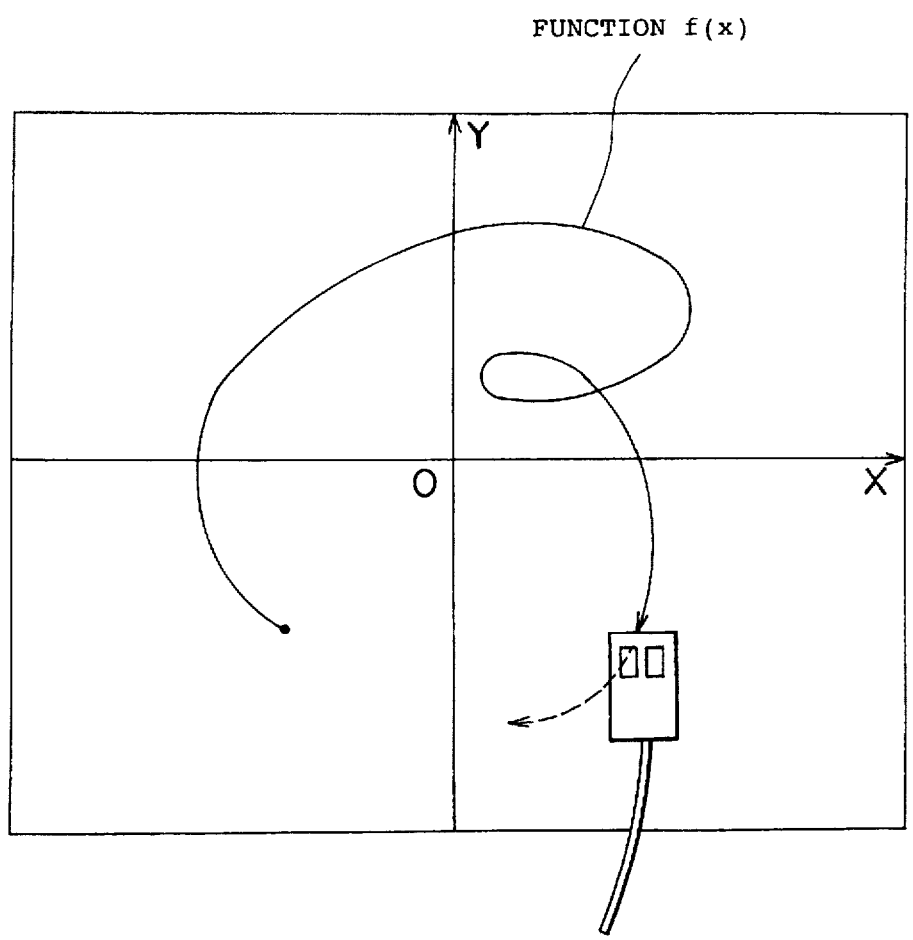
F I G. 8

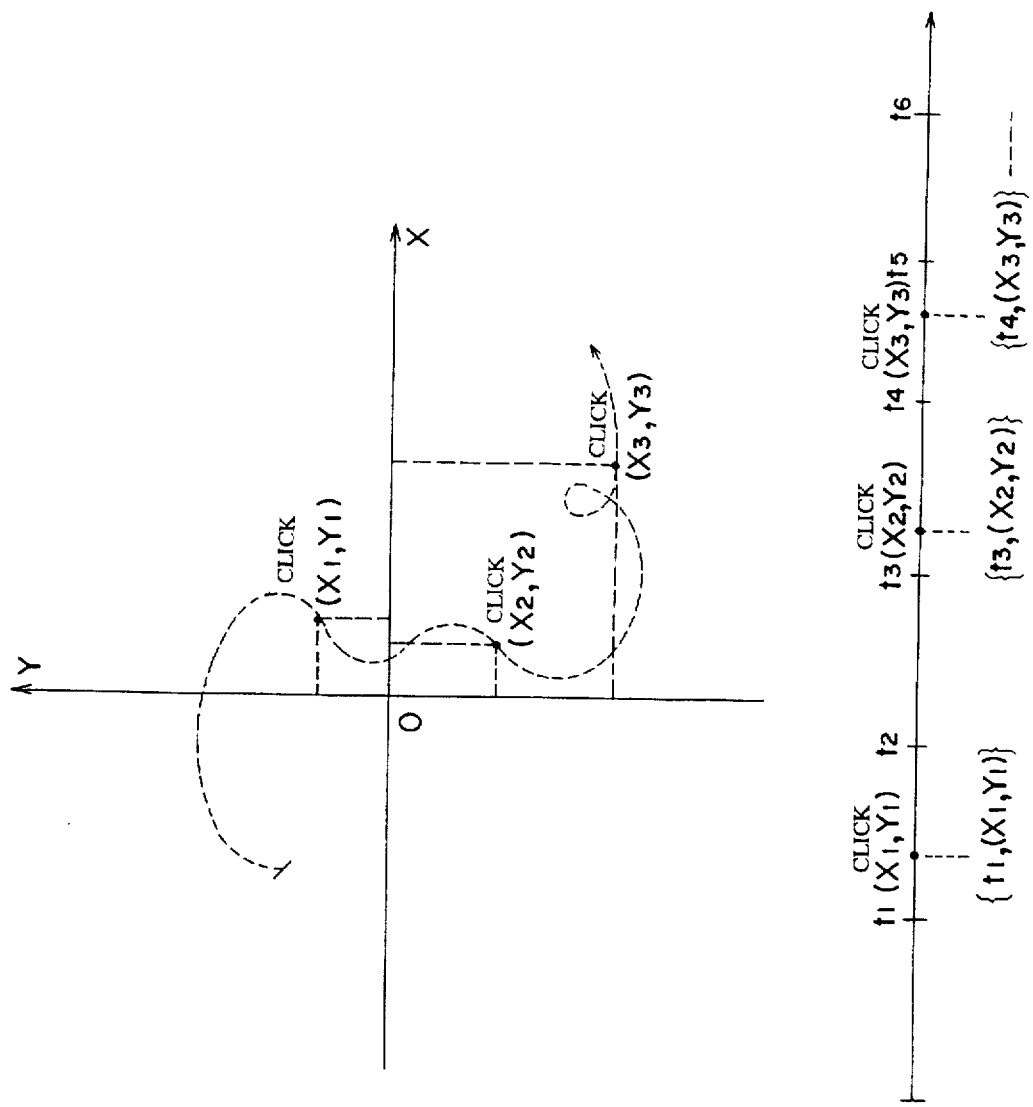
F I G. 9

5,768,387

KEY AUTHENTICATION METHOD AND KEY AUTHENTICATION APPARATUS

BACKGROUND OF THE INVENTION

The present invention relates to a key authentication method and a key authentication apparatus.

(1) Field of Industrial Use

The present invention relates to an effective technology applicable to computer programs or software such as copyrighted image materials and the like, for example, to digitized information software distribution systems.

(2) Prior Art

Recently, technological advancements of memory media that store software have been remarkable, and media such as CD-ROMs, etc., that store large amounts of digital information have come to appear on the market. Consequently, it is expected that computer programs, images, sound, etc., will be digitized and stored within large-volume memory media, and that these memory media will be sold as commercial products.

In other words, copyrighted image materials that have been supplied in such forms as video tapes are now being stored on CD-ROMs and sold, or game software is being stored, utilizing the interactive (bidirectional) interactive nature of CD-ROMs, and distributed within the market.

Incidentally, it is extremely easy to copy digital information such as copyrighted image materials, game software, etc., onto other media. Moreover, since there is no worry that deterioration will occur through the copying of digital information as occurs when analog information is copied, it is easy to duplicate digital information. There is a fear that many acts of copying will impair the profits of manufacturers. In other words, a problem exists whereby users that possess a rudimentary knowledge concerning operating system commands can easily perform software copying if they possess an optical magnetic disk or an optical magnetic disk apparatus, etc., that is capable of large-volume rewrites.

In response to these types of problems, most manufacturers have prohibited rental acts of digital information media. As a result, when users want to use desired software, they must purchase the memory medium used to store that software. However, users often hesitate to make these purchases for the following reasons:

(1) The sales price of the software memory medium is too high.

(2) There is no guarantee that the software that is being sold will fully match the user's desired software.

(3) There is no guarantee that the software memory medium can be used with the hardware that the user possesses.

In consideration of the reasons (1)-(3) listed above, manufacturers are now storing multiple software with limited functions on CD-ROMs, and selling these CD-ROMs at low prices. When end users actually use this functionally limited software, they can determine if the software matches their desired software. When the used software matches the desired software, then the end user pays the regular fee to the manufacturer. The manufacturer then informs the end user of a code that will remove the functional limitations. The end user uses the code that the manufacturer has notified him or her of, and removes the functional limitations of the software. In this way, the end user may utilize all of the functions of the software. Concrete examples of this are shown in FIGS. 11 and 12. Multiple software that has been partially encoded is stored on CD-ROMs, and the hardware terminal of end users are connected through communications circuits to a management center that manages the software. Through using the portions of software that are not encoded, end users can determine whether or not certain software may be used on the hardware they possess, and whether or not that software matches their desired software.

Then, in the cases when the software is usable on the computer they possess, and when the software matches their desired software, end users send a request to the management center to use the software. At that time, the hardware terminal uses the time that the request for usage was made, and the time that the management center was accessed, to generate a random number. Then the hardware terminal attaches this random number to the request for usage and sends this information to the management center.

When the management center receives the request for usage from the hardware terminal, it uses the random number to perform a usage-fee charge. Furthermore, the management center sends to the hardware terminal consent information for the combining of the software.

The hardware terminal uses the consent information received from the management center and decodes the software. As a result, the user may now use all of the functions of the desired software.

Incidentally, in the cases where multiple users willfully synchronize access times to the management center and input times for usage requests, identical random number values are generated at the terminals of the multiple users. In this way, there is a fear that although the management center performs a charge for only a single user, a charge is not performed for the other users, and only consent information is offered to multiple users. In other words, a security-related problem occurs in that, with the exception of a single person, multiple users are able to use software gratuitously. In this way, not only users that have paid the proper usage fees, but also users that have not paid usage fees, are able to use the software. There is the further problem that the software manufacturer or seller will not be able to obtain a reasonable profit for the use of the software.

SUMMARY OF THE INVENTION

According to the present invention, there is provided a method and apparatus that permit the use of software only by those users that pay a software usage fee with the goal of improving the security of software sales.

Below is a simple description of the present invention.

1. Key Authentication Apparatus

The key authentication apparatus of the present invention comprises software storage means for storing encoded software, a terminal for reproducing or executing software of the software storage means, and a management center for managing the use of each separate item of software.

The terminal is, for example, a CD player or a personal computer that is equipped with a CD player, etc. Furthermore, the terminal is equipped with input characteristics detection means and comparison means. Each of the input characteristics detection means and comparison means comprises, for example, a modulated program. When a user uses software, the module is installed within the terminal.

The input characteristics detection means detects the characteristics of operation by the operator when inputting voluntary data into the input apparatus of the terminal. At this time, the user communicates the characteristics data to the management center through communications or other means.

The management center encodes the characteristics information received from the user and generates approval information. Then the management center communicates the approval information through communications or other means.

The comparison means, upon reception of the approval information from the management center, compares this information with the characteristics information detected by the detection means. Then the comparison means, only in the cases where the approval information and the comparison information correspond, approves the use of the software.

Furthermore, in the case where the input apparatus of the terminal is a keyboard, the input characteristics detection means may be made to detect the characteristics of a user keying in multiple keys. For example, the input characteristics detection means may comprise a key-in interval detector device for detecting the time from the measurement initiation time to the time each key is keyed in, and a key-in interval accumulator device for accumulating the times detected by the key-in interval detector device and for generating characteristics data. Here, the key-in interval accumulator device may, after squaring the time for each key detected by the key-in interval detector device, be made to accumulate this information.

Also, in the case where the input apparatus is a mouse, the input characteristics means may be made to detect the characteristics of a user operating a mouse, and to generate characteristics data. For example, the input characteristics detection means may use as characteristics information a function that shows, when a menu screen is displayed on the output screen of the terminal, mouse tracks made by the mouse moving across this menu screen. In this case, the input characteristics detection means may be made to comprise a click location detector device for measuring the time of the mouse movements from the time the menu screen was displayed, and for detecting the times when and the locations where the mouse was clicked, and a characteristics information generation section for taking as characteristics information a function that shows the relationship between the click locations and times detected by the click location detector device.

Additionally, in the case where the terminal is equipped with a handwriting input apparatus, the input characteristics detection means may be made to take as characteristics information handwritten strokes input by the user.

Furthermore, the input apparatus is not limited to keyboards, mice, and handwriting input apparatuses; it may also include remote controllers, keypads, etc.

With the present invention, through the use of non-reproducible unique information, an improvement in security is made possible without complicating the software storage medium. Also, when characteristics information is sent from the terminal to the management center, through encoding this characteristics information, security may be even further improved.

2. Key Authentication Method

The key authentication method of the present invention includes an input characteristics detection step, an approval information generation step, and a comparison step.

The input characteristics detection step is a step for detecting the characteristics of data input voluntarily by a user.

The approval information generation step is a step for the management center to encode characteristics information and to generate consent information.

The comparison step is a step for comparing the characteristics information with the consent information, and for approving the use of software only in those cases where both information types correspond.

Here, the input characteristics detection step includes, in the case where a keyboard is the input apparatus of the terminal, a step for detecting the characteristics of key-ins on the keyboard by a user. For example, the input characteristics detection step may be made to include a key-in interval detection step and a key-in interval accumulation step. In this case, the key-in interval detection step is a step for, when the user keys in multiple keys, detecting the time from the measurement initiation time to the time when each key is keyed in. The key-in interval accumulation step is a step for accumulating the key-in intervals detected within the key-in interval detection step, and for generating characteristics data. The measurement initiation time may be, for example, the time when a message is displayed on the display screen of the terminal that prompts information input.

Also, the input characteristics detection step may be made to include, in the case where the input apparatus of the terminal is a mouse, a click location detection step and a characteristics information generation step. The click location detection step is a step for detecting the time and location of clicks made with the mouse within the operating screen. Also, the characteristics information step is a step for taking as characteristics information a function that shows the relationship between the times and locations detected within the click location detection step.

Additionally, the input characteristics detection step may also be a step for, in the case where the terminal is equipped with a handwriting input apparatus, taking as characteristics information handwritten strokes input by the user.

Also, in the case where a user uses software, a call is made from the terminal to the management center. Then, the user's identification information is sent from the terminal to the management center, and the call is disconnected.

The management information center, based on the identification information, retrieves the user's charge history, and discriminates whether this user is or is not able to pay the software usage fee. Here, the management center, only in those cases where it is possible for the user to pay the usage fee, may be made to call up the terminal and send approval information. Through this method, the user is not made to bear communication fees for the time when the management center is retrieving that user's charge history. Furthermore, the user does not suffer any time restraints from processing delays, etc., by the management center.

BRIEF DESCRIPTION OF THE DRAWINGS

FIG. 5 is an explanatory diagram showing an overall summary of a software sales system of the present invention.

FIG. 8 is a diagram that explains first input characteristics detection processing in the case where a mouse is used.

FIG. 9 is a diagram that explains second input characteristics detection processing in the case where a mouse is used.

DESCRIPTION OF THE PREFERRED EMBODIMENTS

Preferred Embodiment 1

Diagrams will be used to explain preferred embodiments of the present invention, and the present invention will now be described with reference to the accompanying drawings.

Figure 1:
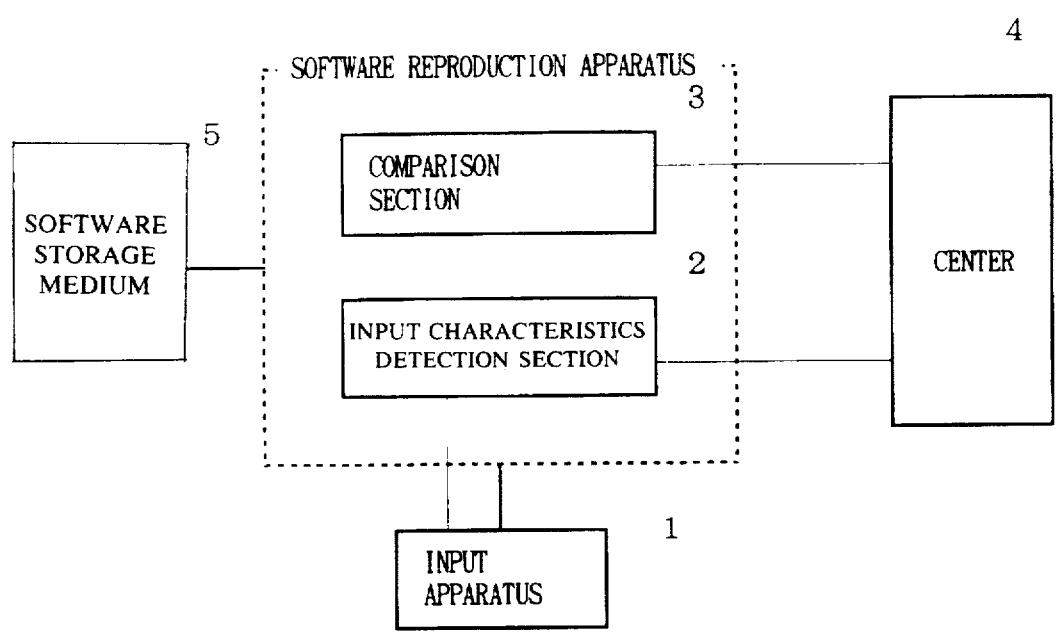
FIG. 1 is a theoretical diagram of the present invention.

FIG. 1 shows the structure of a key authentication apparatus according to an embodiment of the present invention.

The key authentication apparatus is comprised of an input characteristics detection section 2, a comparison (information conversion) section 3, and a center 4.

The input characteristics detection section 2 and the comparison (information conversion) section 3 are formed of a program module, and are installed within a software reproduction apparatus.

The software reproduction apparatus is an apparatus for reading out encoded software from a software storage medium 5, and for decoding and reproducing this software. Furthermore, software decoding is performed according to the approval information distributed from the center 4, and without approval information, decoding cannot be performed. Additionally, the software reproduction apparatus is used with an input apparatus 1 for inputting by the user of voluntary data, commands, etc.

Also, software stored within the software storage medium 5 is, for example, a computer program, characters, graphs, images, or voice, etc.

Below, each configuration element is discussed.

The input characteristics detection section 2 detects the characteristics of the user operating the input apparatus 1.

The comparison section 3, upon reception of consent information from the center 4, compares this consent information with the characteristics information detected by the input characteristics detection section 2. Then, the comparison section 3, in only those cases where both types of information are found to correspond, will approve the use of the software.

Next, the center 4 encodes the characteristics information detected by the input characteristics detection section 2 and generates consent information. Then, the center 4 notifies the user of the consent information.

Here, a communications circuit may be established between the software reproduction apparatus and the center, and the process of communicating characteristics information from the user to the center, as well as the process of communicating consent information from the center to the user, may be performed using the communications circuit. Also, the user may go to inquire at the center 4 and perform an information exchange of the characteristics information and the consent information. This preferred embodiment is explained with the presupposition that the software reproduction apparatus and the center 4 is connected with a communications circuit.

Below, the operation and effects of the present embodiment are discussed.

The user installs the software storage medium 5 that stores the desired software into the software reproduction apparatus. Then, the user inputs into the software reproduction apparatus the command for designating the desired software. At this time, the input characteristics detection section 2 of the software reproduction apparatus, when the user inputs whatever information into the input apparatus, detects the characteristics of that input, and generates characteristics information. Then, the software reproduction apparatus calls up the center 4, and sends the characteristics information and the user's identification information. The software reproduction apparatus disconnects the call when the characteristics information and the user ID has been sent.

The center 4, upon reception of the characteristics information and the identification information, retrieves the user's charge history based on the identification information, and discriminates whether or not the user can pay the software usage fee. If the user is able to pay the usage fee, the center 4 encodes the characteristics information and generates approval information. Next, the center 4 calls up the software reproduction apparatus and sends the approval information.

The comparison section 3 of the software reproduction apparatus, upon reception of the approval information from the center 4, compares this approval information with the characteristics detected by the input characteristics section 2. Here, if both types of information are found to correspond, the comparison section 3 approves the use of the software to the software reproduction apparatus.

The software reproduction apparatus, upon reception of the reproduction approval from the comparison section 3, decodes and reproduces the software using the approval information received from the center 4.

With this preferred embodiment, through managing the use of software using characteristics information unique to the user, the improper use of software may be prevented.

Also, while the center 4 is retrieving the user's charge history, the call is cut off, and when the retrieval is finished, a call-back is made from the center 4 to the software reproduction apparatus; in this way, the user suffers no time restraints from processing delays, etc., by the center, and the cost of the user's communications expense is also reduced.

Preferred Embodiment 2

Next, a diagram will be used to explain the embodiment of this invention shown in FIG. 1.

Figure 2:
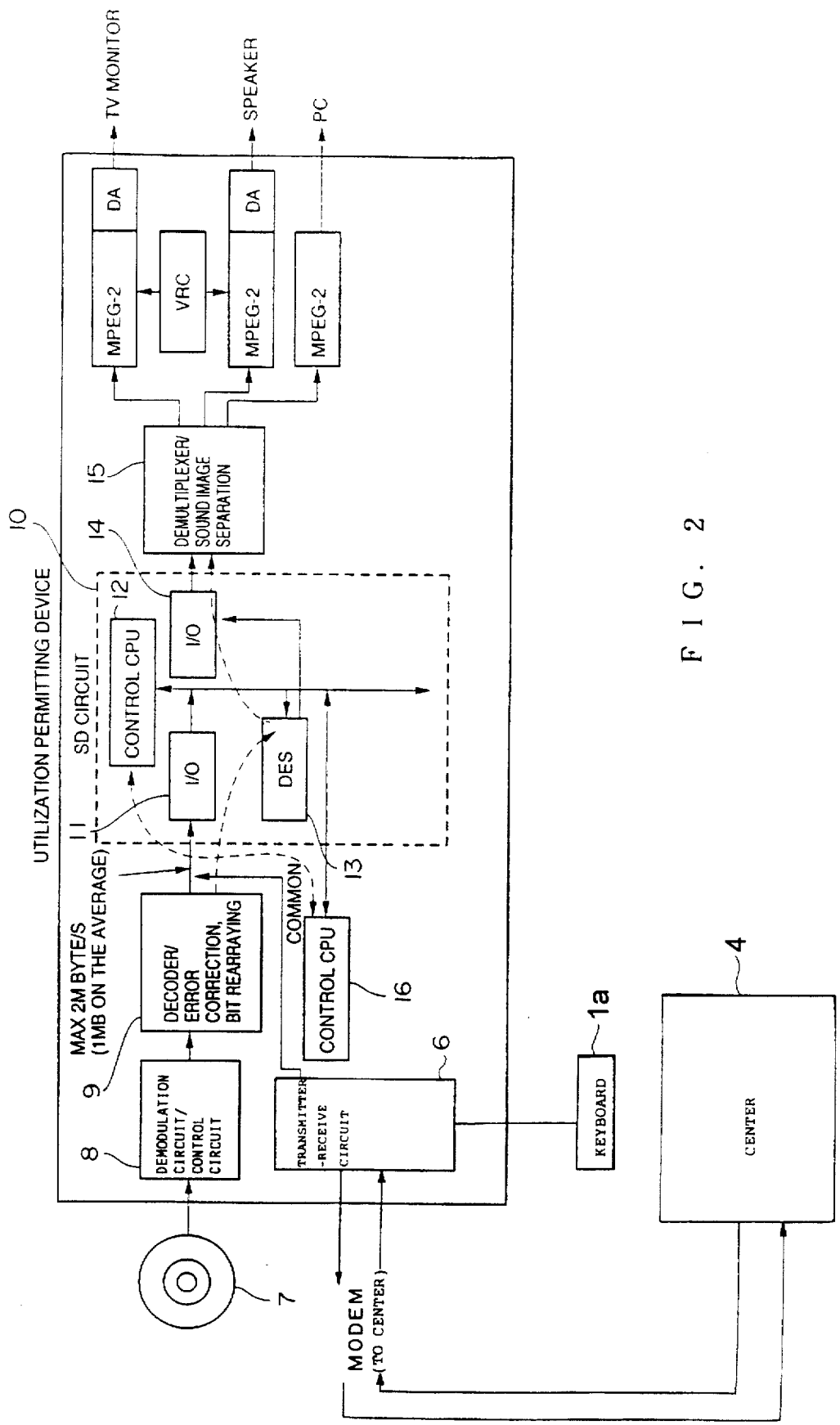
FIG. 2 is a schematic block diagram of a key delivery system according to an embodiment of the present invention.

FIG. 2 is a system summary configuration diagram for applying the key authentication apparatus.

The system of this embodiment has a communications modem connected to the software reproduction apparatus, and a communications circuit connects the software reproduction apparatus with the center 4.

Furthermore, within the preferred embodiment, in order to simplify the explanation, encoded software is offered as stored within a CD-ROM; however, the software may also be obtained as communications information.

The Software Reproduction Apparatus Configuration

In the diagram, the transmitter-receiver circuit 6 is a realization of an example of a module within the present invention. Within the present preferred embodiment, the transmitter-receive circuit 6 may be a board or a card format that is installed in a fixed way within the software reproduction apparatus, or it may be an IC card that is installable or removable at will within a card slot of the software reproduction apparatus. This transmitter-receive circuit 6 is installed within the interface section of the software reproduction apparatus and the communications modem; however, in the case where the communications modem is installed internally within the software reproduction apparatus, this circuit may be installed within the communications modem. Additionally, the software reproduction apparatus is equipped with an input apparatus having a keyboard 1a. The keyboard 1a is also connected to the transmitter-receive circuit 6. A detailed description of this transmitter-receive circuit 6 will follow later.

In the diagram, 8 is the demodulation circuit/control circuit, which has the function of demodulating MPEG standard image/sound information stored within the CD-ROM 7 and sending this information to the decoder 9.

The decoder 9 executes error correction and bit relisting and relays a maximum 2 megabytes/second (an average 1 megabyte/second) of image/sound information to the SD circuit 10.

Within the SD circuit 10, the DES (Data Encoding Standard) 13 decodes the image/sound information (encoded software) received through I/O 11, and sends this information through I/O 14 to the demultiplexer 15 outside of the SD circuit 10. The demultiplexer 15 separates the sound data and the image data, and outputs these to the MPEG processing section (MPEG-2). Here, in the case where the output is to be sent to a computer (PC), MPEG data is output as is; i.e., as digital information. Also, in the case where the output is to be sent to a TV monitor or a speaker, etc., MPEG data is output after it has been converted from digital information to analog information.

Furthermore, the exchange of this information is apportioned between and performed by control CPU 12 of SD circuit 10 and control CPU 16; however, control CPU 12 within SD circuit 10 may be made to work in combination with control CPU 16.

Also, for DES 13, for example, Phipps Publication's "46DATA ENCODING STANDARD NIST" may be used. For the MPEG processing section, for example, "ISO/IEC CD 13818'1–3" may be used.

The Functions of the Transmitter-Receiver Circuit

Figure 3:
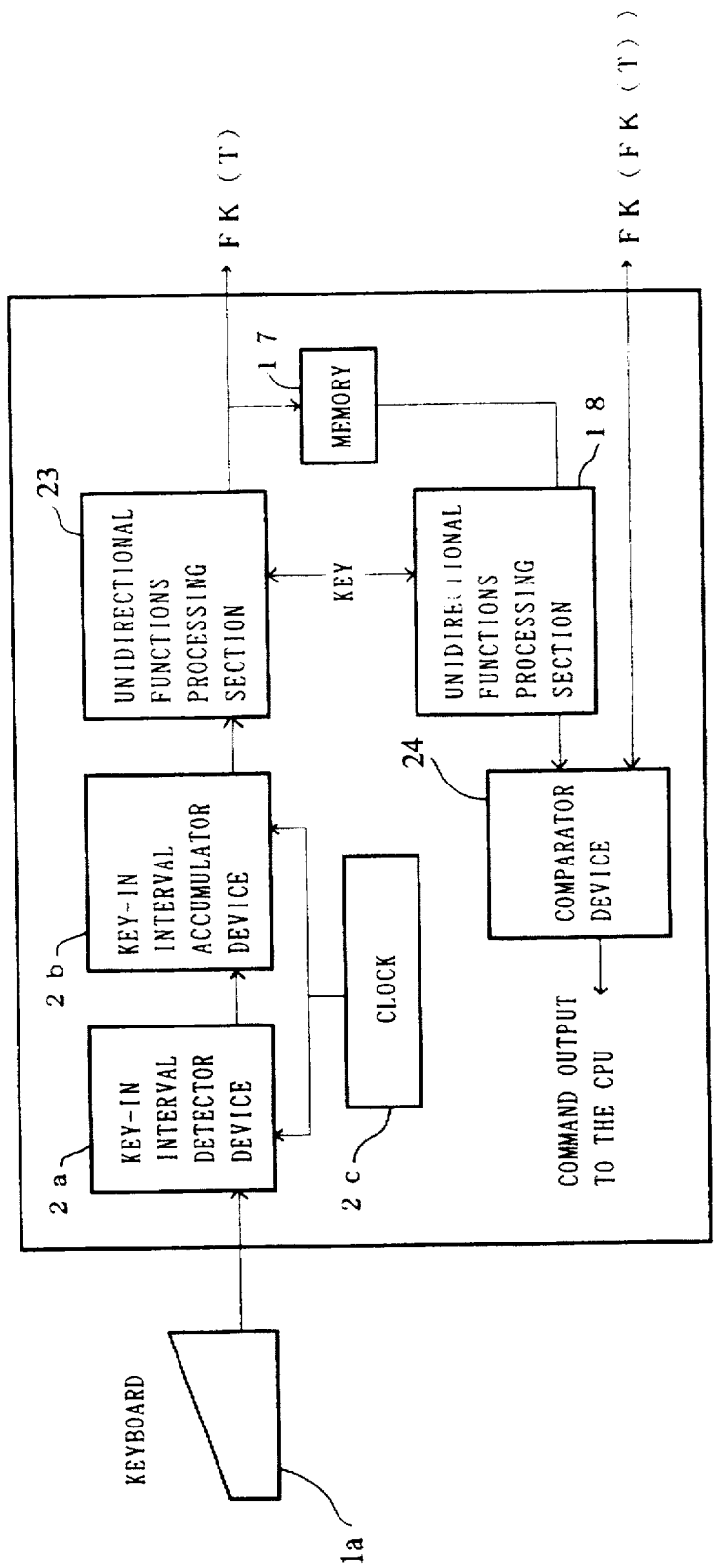
FIG. 3 is a functional block diagram of a transmitter-receiver circuit.

As a module of the present invention, the configuration by functions of the transmitter-receive circuit 6 is shown in FIG. 3.

The transmitter-receive circuit 6 is equipped with the key-in interval detector device 2a, the key-in interval accumulator device 2b, and the clock 2c, which are the input characteristics detection means of the present invention. Additionally, the transmitter-receive circuit 6 is equipped with the unidirectional functions processing section 23, the comparator device 24, the memory 17, and the unidirectional functions processing section 18, which are the comparison means. The key-in interval detector device 2a, when the user keys in multiple keys of keyboard 1a, detects the time from the standard time to the time each key is keyed in. The standard time may be, for example, the time when a message screen is displayed on the display apparatus of the software reproduction apparatus that prompts the input of prescribed information.

The key-in interval accumulator device 2b accumulates key-in times detected by the key-in interval detector device 2a.

Furthermore, processing between the key-in interval detector device 2a and the key-in interval accumulator device 2b is performed until the input of information from the standard time is completed.

The unidirectional functions processing section 23 encodes data showing the accumulation results based on a prescribed key. Then, the unidirectional functions processing section 23 sends the encoded information to the center 4, and, at the same time, registers this information within the memory 17.

The unidirectional functions processing section 18, upon reception of the approval information from the center, reads out encoded information from the memory 17, and takes this encoded information and encodes it yet again. The encoding is performed in the same way as that at the center 4 to be discussed later.

The comparator device 24 compares the approval information with the information encoded by the unidirectional functions processing section 18. Then, in the case where both types of information match, it communicates this information match to the control CPU 12 of SD circuit 10.

Functions Within the SD Circuit

The SD circuit 10, just as the module discussed above, may be a circuit in a board or a card format that is installed in a fixed way within the software reproduction apparatus, or it may be an IC card that is installable or removable at will within a card slot of the software reproduction apparatus.

The control CPU 12 of this SD circuit 10 has the means of determining whether or not to permit decoding within DES 13 of the encoded software data read in from CD-ROM 17. Specifically, when an information match is communicated to the control CPU 12 from the transmitter-receive circuit 6, the control CPU 12 communicates a decoding command to DES 13.

Additionally, the control CPU 12 has the function of, in the case where the use of software has been approved, measuring the amount of decoding performed by DES 13 or the decoding time, and sending that information via the transmitter-receive circuit 6 to the center 4. Here, the control CPU 12 has the function, in the case where it is sending decode amounts or decode times, etc., to the center 4, of using the DES 13 to encode the information, and of sending the encoded information to the center 4.

The Functions of the Center

Figure 4:
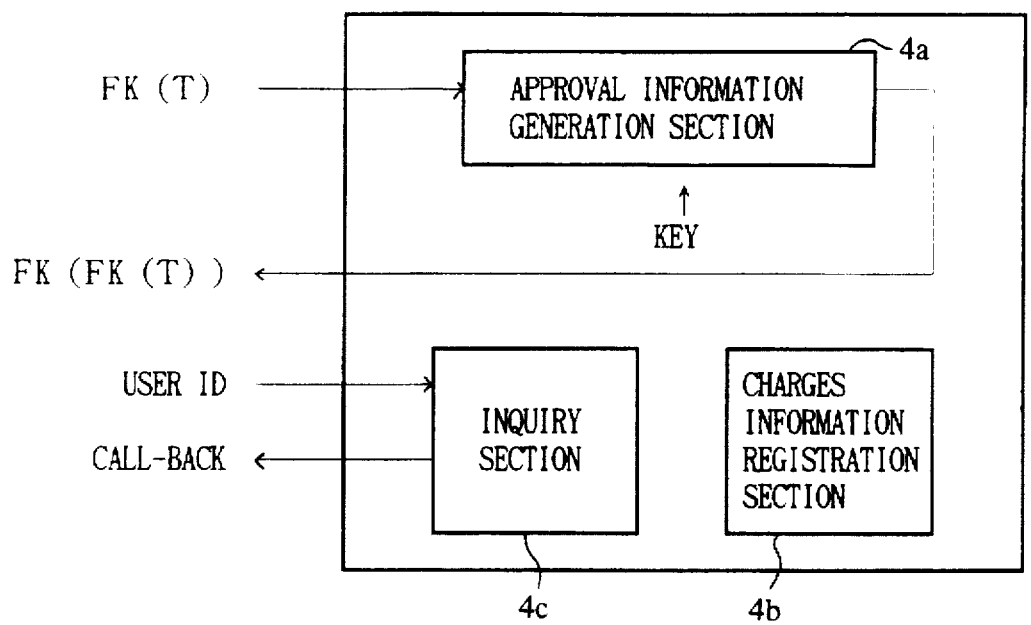
FIG. 4 is a functional block diagram of a center of the key delivery system of the present invention.

FIG. 4 shows a function-specific configuration of the center 4 as found within the present embodiment.

The center 4 is comprised of the approval information generation section 4a, the charges information registration section 4b, and the inquiry section 4c.

The approval information generation section 4a, upon reception of the encoded characteristics information from the software reproduction apparatus, further encodes this characteristics information and generates approval information. Encoding by the approval information generation section 4a is performed in the same order as that in the previously mentioned unidirectional functions processing section 18.

The charges information registration section 4b registers for each user ID the charge balance of each user.

The inquiry section 4c, upon reception of a user ID from the software reproduction apparatus, performs a retrieve from the charges information registration section 4b. Then, it discriminates whether or not the user's charge balance exceeds the software usage fee. The inquiry section 4c, if the charge balance exceeds the software usage fee, has the function of calling back the software reproduction apparatus. Here, the user ID is the user's name, the user's credit number, or the user's account number, etc.

An Overall View of a Software Sales System Using This Invention

Below is an explanation, based on FIG. 5, of an overall view of a software sales system realized with the present invention.

First, the end user proceeds to the sales store 19, etc. (communications sales are also permissible), and purchases the CD-ROM (7) as the software storage medium that stores the software. At the same time, the user also purchases an operating application disk 20 such as drive software, etc., that makes this software reproducible on the user's software reproduction apparatus, and a card-type transmitter-receive circuit 6. Here, the operating application disk 20, may, for example, take the form of a floppy disk, and this may be used as the external user information storage medium. Also, even though the CD-ROM (7) stores multiple software, since this is not a sales method whereby the CD-ROM is to be sold out, the sales price of the CD-ROM itself may be set at an extremely low price. Also, the sales store 19 may also be a rental store.

In other words, within the present invention, in the case where all of the software data stored on a CD-ROM is encoded and is to be decoded and reproduced, it is essential that a transmitter-receive circuit 6 be used as the module for maintaining a high level of security. Also, as will be discussed later, a charge collection system corresponding to the amount of software used is put fully into place. Furthermore, even if the encoded data stored on the CD-ROM itself is copied onto a separate medium, then even if the CD-ROM is rented, if a charge collection system that corresponds to the amount of software used is fully in place, there is no decline in the profits of the software provider.

The user, in the case where he or she wants to reproduce the software stored on the CD-ROM within his or her own software reproduction apparatus, inserts the transmitter-receiver circuit 6 into the card drive apparatus 22. Then, the user loads both the CD-ROM (7) and the operating application disk 20 into the software reproduction apparatus. Next, the user starts up the transmitter-receiver circuit 6 inserted within the software reproduction apparatus, and calls-up through his or her home telephone 21 the management center 4 from the modem (modulation apparatus) set up external to the software reproduction apparatus. At this time, the transmitter-receive circuit 6 detects the characteristics of the user's key inputs on the keyboard, encodes this characteristics information, and sends this information along with the user ID to the management center 4. Then, the transmitter-receiver circuit 6 disconnects the call.

Here, the operation of the transmitter-receiver circuit 6 will be explained based on FIG. 6 and FIG. 7.

Figure 6:
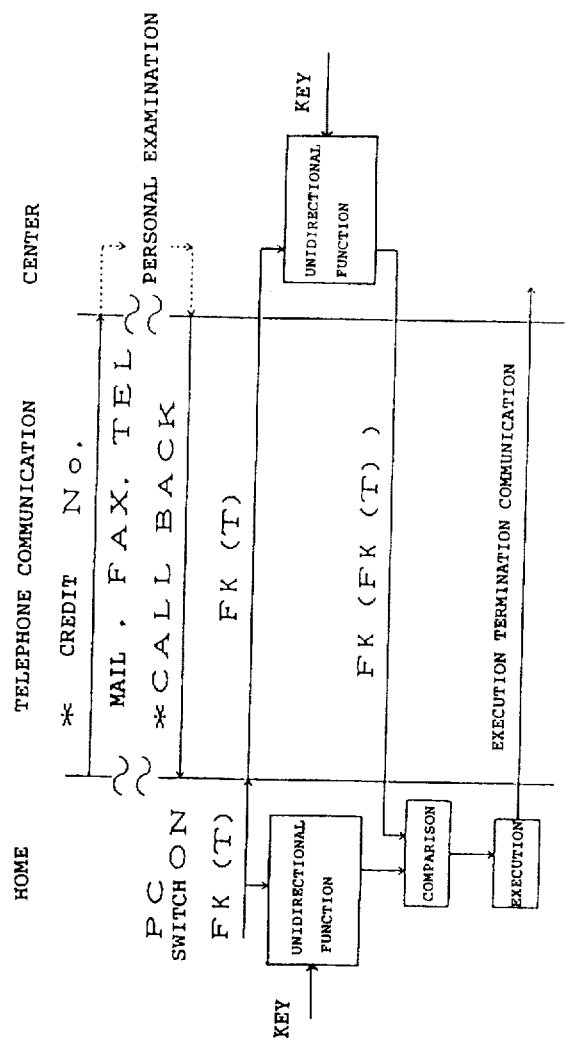
FIG. 6 is a sequence diagram showing the processing process at the time of software usage.
Figure 7:
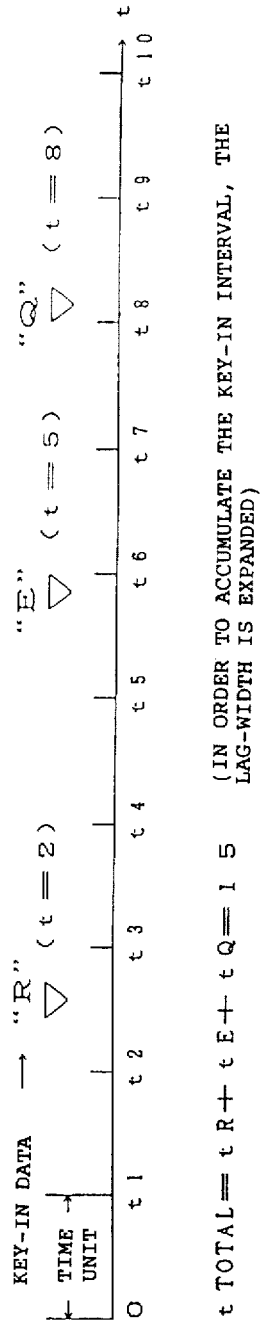
FIG. 7 is an explanatory diagram showing detection processing of key-in intervals and accumulation processing of key-in intervals.

FIG. 6 is a sequence diagram that shows the send-and-receive process between the software reproduction apparatus and the management center 4; FIG. 7 shows the key-in characteristics detection process.

Figure 11:
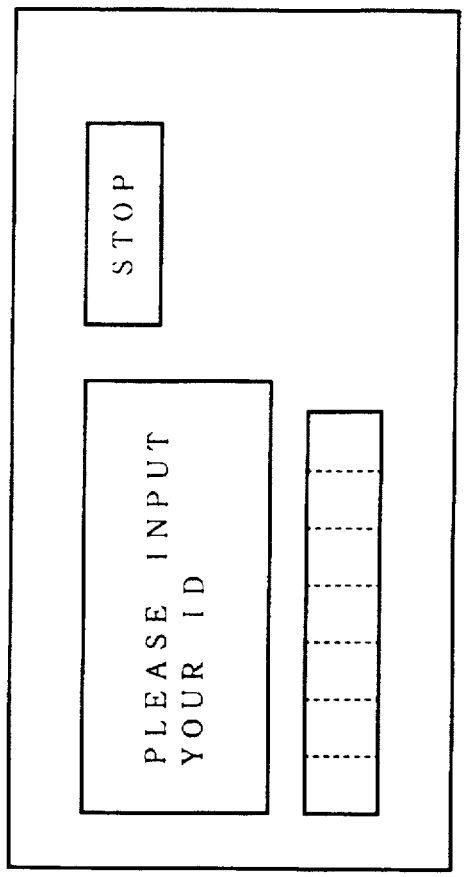
FIG. 11 is an indicative concrete example of a message screen.

The transmitter-receiver circuit 6 outputs a message screen (refer to FIG. 11) from the display apparatus of the software reproduction apparatus that prompts the input of the user ID. The key-in interval detector device 2a takes as the standard time the time when the message screen is output, and initiates measurement of key-in times. As shown in FIGS. 6 and 7, in the case where the user ID is input as "X,Y,Z", the key-in interval detector device 2a, when the "X" key is keyed in, detects the elapsed time $t_2$ from the standard time to the current time, and communicates this to the key-in interval accumulator device 2b. Next, when the user keys in key "Y", the key-in interval detector device 2a detects the elapsed time $t_5$ from the standard time to the current time, and communicates this to the key-in interval accumulator device 2b. Here, the key-in interval accumulator device 2b adds key-in time $t_2$ and key-in time $t_5$.

Additionally, when the user keys in key "Z", the key-in interval detector device 2a detects the elapsed time $t_8$ from the standard time to the current time, and communicates this to the key-in interval accumulator device 2b.

The key-in interval accumulator device 2b adds key-in time $t_8$ to the previous addition results $(t_2+t_5)$. Then, when the user lastly keys in the return key of the keyboard, the key-in interval detector device 2a and the key-in interval accumulator device 2b terminate key-in time detection and accumulation processing. The key-in interval accumulator device 2b communicates the accumulation results $(t_2+t_5+t_8)$ to the unidirectional functions processing section 23.

The unidirectional functions processing section 23 encodes with the prescribed key the accumulation results received from the key-in interval accumulator device 2b, and sends this encoded information and the user ID to the management center 4.

Here, the transmitter-receive circuit 6 causes a send termination message to be displayed on the display apparatus. Upon recognition of this message, the user disconnects the call established between himself or herself and the management center 4.

The management center 4, upon reception of the user ID and the encoded characteristics information from the software reproduction apparatus, inputs the user ID into inquiry section 4c, and causes the characteristics information to be input into the approval information generation section 4a.

The inquiry section 4c, based on the user ID, retrieves the user's charge balance. Then, the inquiry section 4c discriminates whether the charge balance exceeds the software usage fee. Also, the approval information generation section 4a encodes the characteristics information with prescribed key information and generates approval information.

Here, if the charge balance exceeds the usage fee, the inquiry section 4c calls back the software reproduction apparatus, and the approval information generation section 5a sends the generated approval information.

The transmitter-receiver circuit 6 of the software reproduction apparatus, upon reception of the approval information from the management center 4, inputs this approval information to the comparator device 24 and, at the same time, inputs an output command to the memory 17.

The memory 17, upon reception of the output command, reads out the characteristics information encoded by the unidirectional functions processing section 23 and causes this information to be input into the unidirectional functions processing section 18.

The unidirectional functions processing section 18, upon input of the encoded characteristics information, encodes this characteristics information with key information identical to that of the management center 4. Then, the unidirectional functions processing section 18 causes the encoded characteristics information to be input into the comparator device 24.

The comparator device 24 compares the characteristics information inputted from the unidirectional functions processing section 18 with the approval information received from the management center 4. Then, the comparator device 24, only in those cases where both types of information match, communicates the fact that the information matches to the SD circuit 10.

The SD circuit 10, upon reception of the information match communication, reads the CD-ROM (7), and decodes the necessary software. Then, the SD circuit 10 transmits the decoded software to the program storage area (memory).

Along with this, the control CPU 12 counts either the decoded data amount or the decoded time of this software, and immediately sends these values to the center 4. The center 4, based on the previously stated decoded data amount or the decode time, subtracts this amount from the previously stated user charge balance. At the same time as this, the center 4, based on the charges information received from the software reproduction apparatus, performs processing in the form of drawing out from the account of financial institution 33 a fee corresponding the usage amount used by the user, and transfers that amount to the account of the relevant software provider.

Conversely, the center 4, in the case where the charge balance is "0", communicates the termination of processing to the software reproduction apparatus. Within the software reproduction apparatus that received this communication, the control CPU 16 terminates output to the TV monitor and output to the computer (PC). Furthermore, along with this, as image output, a message showing that the credit balance is "0", or a software advertisement, etc., may also be superimposed.

Also, as in the previously stated example, in the case where charges are managed by the center 4, in order for user information such as charge information, etc., to be output externally from the software reproduction apparatus, the control CPU 12, in order to improve security, encodes the charges information using the DES 13, and communicates the encoded data through the telephone circuit to the center 4.

In this way, with the present invention, because not only the software stored on the CD-ROM, but also the user information generated through the operation of that software is encoded and output externally, the improper usage of software through tampering with user information may be prevented.

Furthermore, as in the preferred embodiment explained above, the offering of software to the software reproduction apparatus is not limited to tangible media such as CD-ROMs; it is also a matter of course that the software may be obtained as communications data from a host computer via a high-speed communications system.

Also, within the present preferred embodiment, an example was suggested and explained whereby the time of detection of input characteristics was set as the user ID input time; however, this time may also be considered as the time when other data is input.

Additionally, within the present preferred embodiment, an example was suggested and explained whereby the input apparatus was a keyboard; however, the input apparatus may also be a mouse, a handwriting input apparatus, or a remote controller of the software reproduction apparatus.

Figure 12:
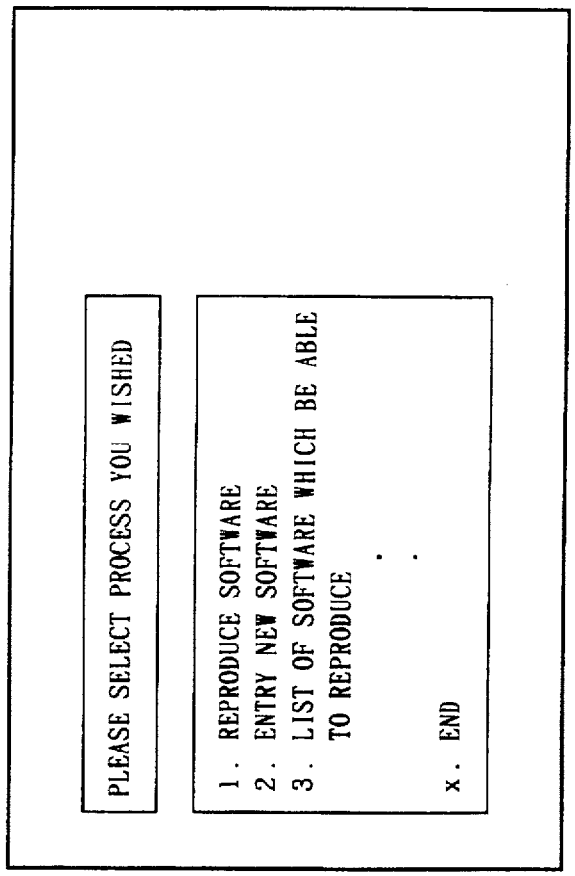
FIG. 12 is an indicative concrete example of a menu screen.
Figure 13:
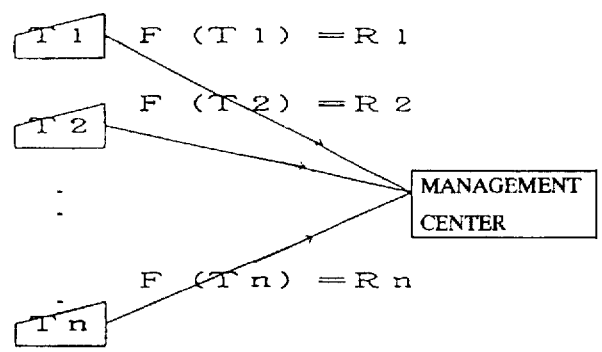
FIG. 13 is an explanatory diagram showing an existing software sales system.
Figure 14:
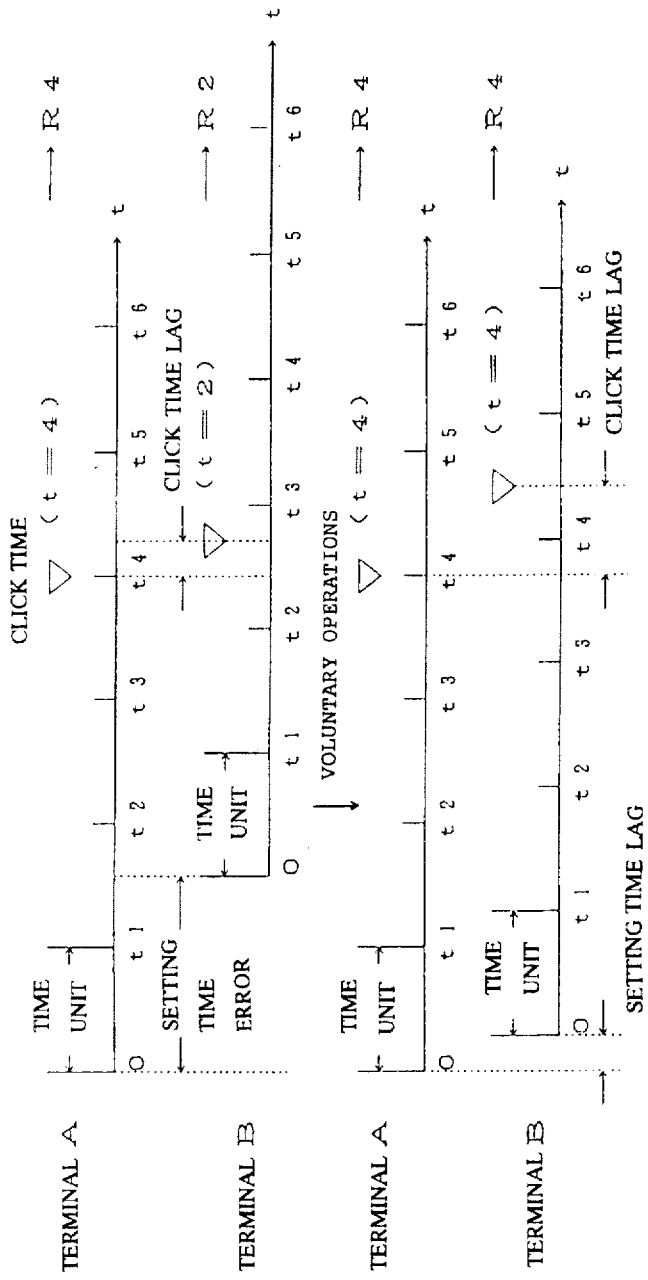
FIG. 14 is an explanatory diagram showing an existing order of generating user-unique information.

In the case where a mouse is used, a menu screen is caused to be displayed such as that shown in FIG. 12, and the tracks of the mouse movements on the menu screen may be detected, and the characteristics information may be a function that shows the path of these tracks (refer to FIG. 8).

Also, as shown in FIG. 9, a method may also be used whereby the times of the mouse click on a menu screen (two-dimensional axis) and the coordinate values at the time of that click may be detected, and, based on this dual information, a function is generated.

Figure 10:
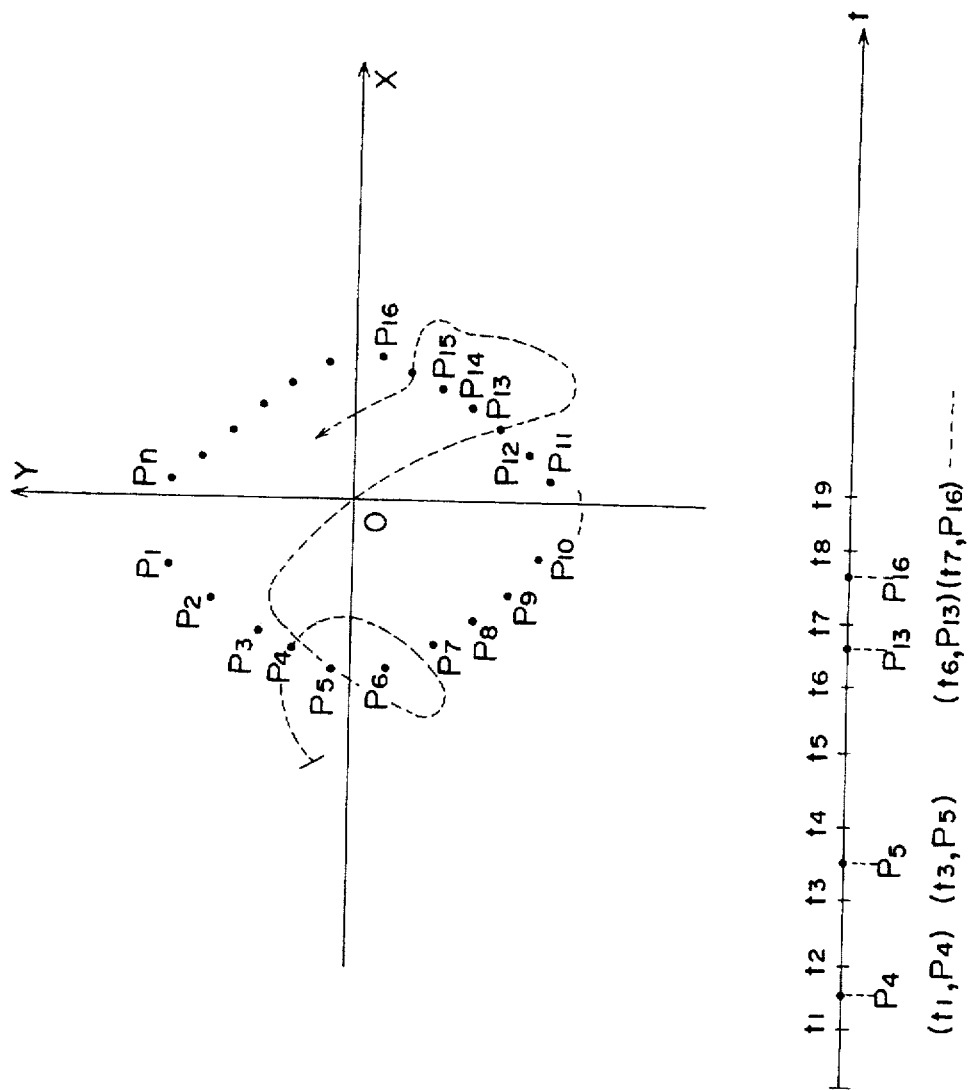
FIG. 10 is a diagram that explains third input characteristics detection processing in the case where a mouse is used.

Additionally, as shown in FIG. 10, a method may also be used whereby multiple specific points are previously established on a menu screen (two-dimensional axis), and based on the time it takes to move to each specified point and the coordinate values of each specified point, a function is generated.

In the case where a handwriting input apparatus is used, a function is generated based on the handwriting stroke characteristics of a character string that depicts the usage request.

Additionally, in the case where a remote controller is used, just as with keyboards, the operation button press-down interval may be detected.

In these ways, with the present embodiment, through the use of keyboard key-in characteristics, mouse operation characteristics, input character handwriting characteristics, or remote controller control button push-down characteristics as information for identifying each user, unique information may be generated for each individual user, and the willful imitation by a user of another person's input characteristics for the gratuitous use of software may be prevented.

Also, through the adoption of a method whereby, after the user communicates his or her user ID to the center, the call is disconnected, and the center calls back the user following a personal examination of the user, means that the user does not suffer from time restraints as a result of processing delays, etc., by the center.

What is claimed is:

1. A key authentication apparatus having a software storage medium for storing software that comprises encoded programs, characters, graphs, images, or sound, the key authentication apparatus comprising:

input characteristics detection means for detecting characteristics of input operations performed by a user at a time the user uses the software of said software storage medium;

a management center for encoding the input characteristics detected by said input characteristics detection means and, in response, generating consent information; and comparison means for comparing the consent information generated by said management center with the input characteristics detected by said input characteristics detection means, and if both are in correspondence with each other, for approving the use of said software.

2. The key authentication apparatus of claim 1, wherein said input characteristics detection means detects the characteristics of key inputs on a keyboard by the user.

3. The key authentication apparatus of claim 2, wherein said input characteristics detection means comprises:

a key-in interval detector device for detecting times from a measurement initiation time point to the key in of each key input at the time when the user keys in multiple keys; and a key-in interval accumulator device for accumulating the key-in times of each key detected by said key-in interval detection device.

4. The key authentication apparatus of claim 1, wherein said input characteristics detection means detects characteristics of movements on an operating screen based upon a mouse.

5. The key authentication apparatus of claim 4, wherein said input characteristics detection means comprises:

a click location detector device to detect locations and times of mouse clicks upon an operating screen; and a characteristics information generating section for generating the characteristics information from the locations and times detected by said click location detector device.

6. The key authentication apparatus of claim 1, wherein said input characteristics detection means detects characteristics of handwritten strokes of the user.

7. A key authentication method comprising:

an input characteristics detection step detecting characteristics of input operations performed by a user at a time when the user uses software of a software storage medium, wherein the software includes encoded programs, characters, graphs, images, or sound;

a consent information generation step encoding the input characteristics, and in response, generating consent information; and a comparison step comparing the consent information and the input characteristics, and, in only those cases where both are in correspondence with each other, approving the use of said software.

8. The key authentication method of claim 7, wherein said input characteristics detection step comprises a step detecting characteristics of key inputs on a keyboard by a user.

9. The key authentication method of claim 8, wherein said input characteristics detection step comprises:

a key-in interval detection step detecting times from a measurement initiation time point to the key in of each key input when the user keys in multiple keys; and a key-in interval accumulation step accumulating key-in times of each key detected in said key-in interval detection step.

10. The key authentication method of claim 7, wherein said input characteristics detection step detects characteristics of movements on an operating screen based upon a mouse.

11. The key authentication method of claim 10, wherein said input characteristics detection step comprises:

a click location detection step detecting locations and times of mouse clicks upon the operating screen; and a characteristics information generation step generating the characteristics information from the locations and times detected in said click location detection step.

12. The key authentication method of claim 7, wherein said input characteristics detection step comprises a step detecting characteristics of handwritten strokes of the user.

13. A key authentication method comprising the steps of:

calling up, when encoded software is used at a terminal, a management center that manages use of each item of software;

sending from said terminal to said management center identification information that specifies the user at said terminal and input-characteristics information;

disconnecting calls that connect said terminal with said management center in response to sending said identification information to said management center;

retrieving a charge history of the user by said management center based on said identification information, and discriminating whether the user has an ability to pay usage fees for the software;

calling up said terminal by said management center if said user has the ability to pay usage fees for the software; and sending consent information from said management center to said terminal to decode the software, said consent information being based upon said input-characteristics information.

* * * * *